(12) United States Patent
Morimoto

(10) Patent No.: US 7,983,337 B2
(45) Date of Patent: Jul. 19, 2011

(54) MOVING PICTURE CODING DEVICE, MOVING PICTURE CODING METHOD, AND RECORDING MEDIUM WITH MOVING PICTURE CODING PROGRAM RECORDED THEREON

(75) Inventor: Michiyo Morimoto, Fuchu (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 154 days.

(21) Appl. No.: 12/343,428

(22) Filed: Dec. 23, 2008

(65) Prior Publication Data

US 2009/0168870 A1 Jul. 2, 2009

(30) Foreign Application Priority Data

Dec. 27, 2007 (JP) ................................. 2007-338311

(51) Int. Cl.
*H04B 1/66* (2006.01)

(52) U.S. Cl. ......... 375/240.03; 375/240.05; 375/240.02; 375/240.06; 375/240.15; 375/240.12; 375/240.16; 348/699; 348/700; 382/236; 382/238; 382/251

(58) Field of Classification Search ............. 375/240.03, 375/240.05, 240.02, 240.06, 240.15, 240.12, 375/240.16; 348/699, 700; 382/236, 238, 382/251

See application file for complete search history.

(56) References Cited

U.S. PATENT DOCUMENTS

| 7,151,856 B2 * | 12/2006 | Uchibayashi et al. ........ 382/236 |
| 2006/0146929 A1 * | 7/2006 | Tikhotski et al. ........ 375/240.03 |

FOREIGN PATENT DOCUMENTS

| JP | 2000-032468 A | 1/2000 |
| JP | 2001-245297 A | 9/2001 |
| JP | 2001-251627 A | 9/2001 |

OTHER PUBLICATIONS

An English Translation of Notice of Reasons for Rejection mailed by the Japan Patent Office for Japanese Patent Application No. 2007-338311 on Apr. 14, 2009.

* cited by examiner

*Primary Examiner* — Shawn An
(74) *Attorney, Agent, or Firm* — Knobbe, Martens, Olson & Bear LLP

(57) ABSTRACT

According to one embodiment, a moving picture coding device which performs a motion-compensated prediction for moving picture data in macroblocks, applies discrete cosine transform and quantization to a prediction error obtained by the motion-compensation prediction to obtain a quantization coefficient, and applies variable-length-coding to the quantization coefficient together with a motion vector to be obtained by the motion-compensation prediction, when controlling each coding mode of target macroblocks for the variable-length-coding in response to a picture type, the coding device determines whether the quantization coefficient is not smaller than a threshold if the picture type is a B, performs motion detection processing only by frame prediction if the quantization coefficient is not smaller than the threshold, performs the motion detection processing after conventional frame/field prediction determination if the quantization coefficient is smaller than the threshold, and skips coding processing of the target macroblocks under prescribed conditions after motion detection processing.

4 Claims, 3 Drawing Sheets

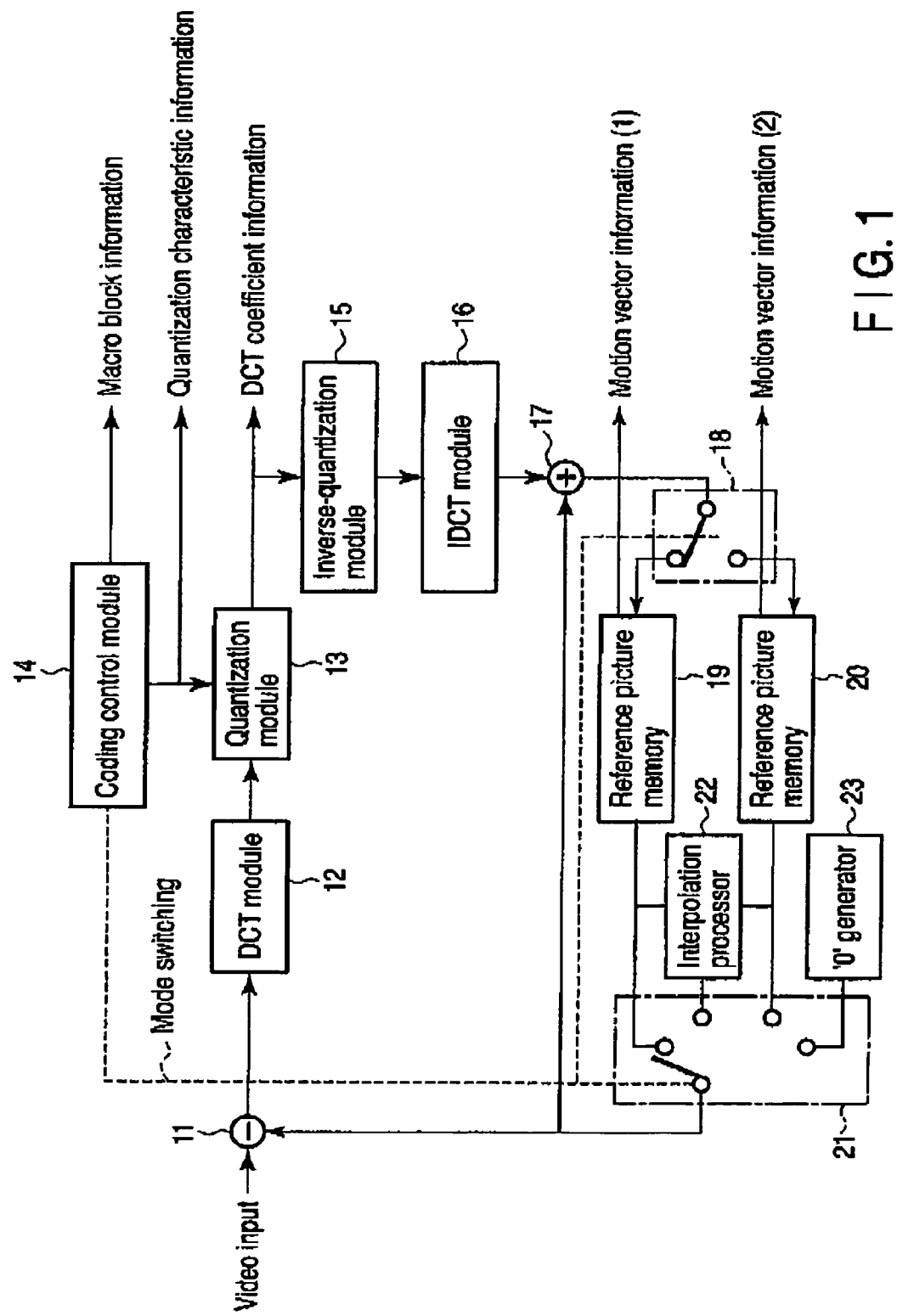
F I G. 1

MOVING PICTURE CODING DEVICE, MOVING PICTURE CODING METHOD, AND RECORDING MEDIUM WITH MOVING PICTURE CODING PROGRAM RECORDED THEREON

CROSS-REFERENCE TO RELATED APPLICATIONS

This application is based upon and claims the benefit of priority from Japanese Patent Application No. 2007-338311, filed Dec. 27, 2007, the entire contents of which are incorporated herein by reference.

BACKGROUND

1. Field

One embodiment of the invention relates to a moving picture coding device and a moving picture coding method which perform compression coding on moving picture data depending on an algorithm, such as a moving picture experts group (MPEG), and a recording medium with a moving picture coding program recorded thereon.

2. Description of the Related Art

As commonly known, a moving picture coding device that relies on the MPEG system, etc., applies motion compensation prediction in blocks to moving picture data and codes a prediction error and a motion vector which have been obtained through this compensation prediction processing. Various improvements are conventionally available for enhancing the coding efficiency of the moving picture data in the moving picture coding device. Of such, a proposal using skip determination, which determines whether or not a prediction error after discrete cosine transform (DCT) and quantization of a block to be coded is equivalent to '0' (zero), and if it is determined that the error is equivalent to '0', in a case that a motion vector of a P picture is smaller than a first threshold, and in a case that a difference in size between a motion vector of a B picture and a motion vector in the next block of the B picture is smaller than a second threshold, processing of the block is omitted and the variable length coding of the block is omitted by replacing the motion vector with '0', thereby enhancing the compression rate, has been disclosed (e.g., Jpn. Pat. Appln. KOKAI Publication No. 2001-251627).

However, in the method depending on the skip determination which has been proposed, in a case that In the P picture, it is determined that a prediction error of a quantization block in a macroblock (MB) is equivalent to '0', in a case that the value of a motion vector is not larger than the first threshold, since the method determines that the block is a ship macroblock without exception, the determination may affect the following pictures. Further, in the B picture, in a case that it is determined that a prediction error of a quantization block in a macroblock is equivalent to '0', and that a difference vector in the same direction is not larger than the second threshold, the method may deteriorates the picture quality if a quantization error is small.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

FIG. 1 is a block diagram depicting an embodiment of a moving picture coding device regarding the invention;

DETAILED DESCRIPTION

Figure 2:
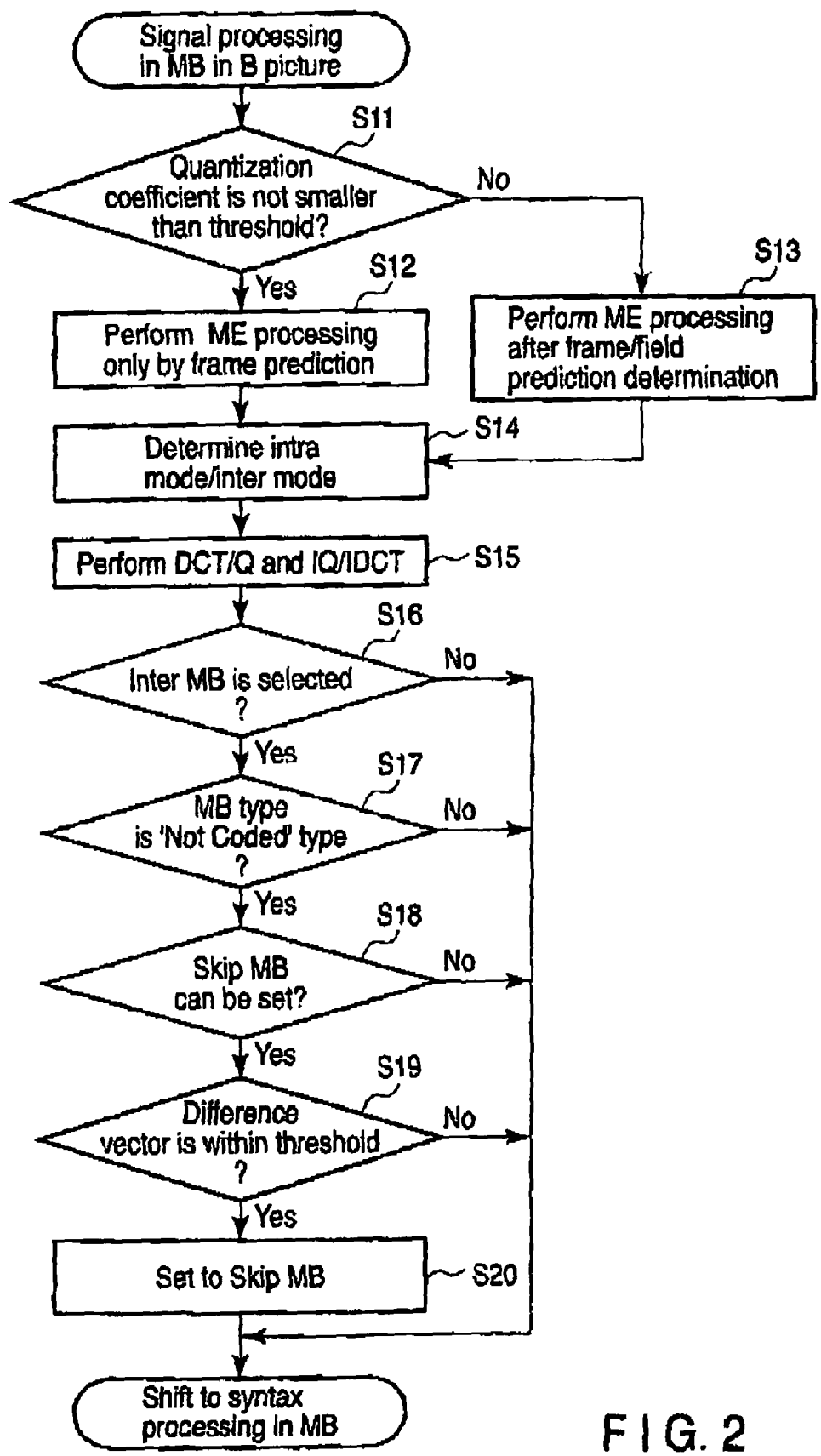
FIG. 2 is a flowchart depicting signal processing in macroblocks (MBs) in a B picture regarding the invention implemented by a coding control module 14 of the moving picture coding device depicted in FIG. 1.

Various embodiments according to the invention will be described hereinafter with reference to the accompanying drawings. In general, according to one embodiment of the invention, there is provided a moving picture coding device which performs a motion-compensated prediction for moving picture data in macroblocks, applies discrete cosine transform and quantization to a prediction error obtained by the motion-compensation prediction to obtain a quantization coefficient, and applies variable-length-coding to the quantization coefficient together with a motion vector to be obtained by the motion-compensation prediction, comprising: a coding control module which controls each coding mode of target macroblocks for the variable-length-coding in response to picture types, wherein, the coding control module includes: a quantization coefficient determining module which determines whether the quantization coefficient is not smaller than a threshold when the picture types of the target macroblocks are a B picture which does not becomes a reference frame of other frames; a frame prediction mode processing module which performs motion detection processing only by frame prediction if the quantization coefficient is not smaller than the threshold; a conventional mode processing module which performs the motion detection processing after conventional frame/field prediction determination if the quantization coefficient is smaller than the threshold; and a skip determination control module which skips coding processing of the target macroblocks under prescribed conditions after motion detection processing by the frame prediction mode processing module or the conventional mode processing module.

FIG. 1 is a block diagram illustrating an embodiment of a moving picture coding device regarding the invention. A video signal input to the coding device is sent to a subtracter 11 and a difference between the video signal and screen data which has been previously coded and reproduced is found. A DCT module 12 applies DCT processing to the difference data, and a quantization module 13 applies quantization processing on the difference data, then outputs the data as DCT coefficient information. A quantization characteristic at the quantization module 13 is decided by a coding control module 14, and its quantization characteristic information is coded simultaneously. The DCT coefficient information coded by the quantization module 13 is applied with inverse quantization by inverse quantization module 15 so as to be used as a prediction picture on the next screen. After the DCT coefficient information is applied with inverse discrete cosine transform (IDCT) by an IDCT module 16, the DCT coefficient information is added to the previous reproduction picture on the basis of motion vector information by an adder 17. Then, a switch 18 sends the information to first and second reference picture memories 19, 20 alternately, and the memories 19, 20 store reference screens for two screens for reproducing an I picture and a P picture in order to perform interactive prediction. In an inter mode, the reference screen stored in each memory 19, 20 is selectively subjected to interpolation processing by a switch 21 or interpolation processor 22. In an intra mode, the reference screens are replaced with '0' generated from a '0' generator 23 to be fed back to the subtracter 11.

Figure 3:
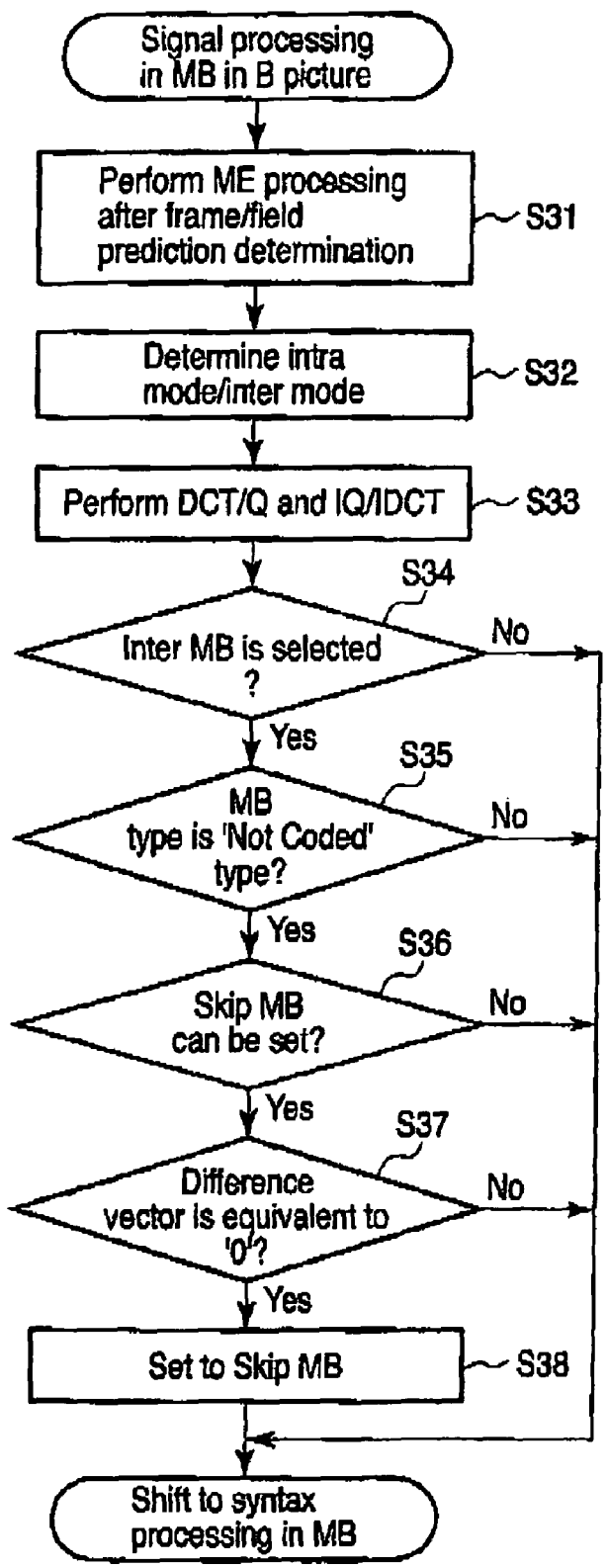
FIG. 3 is a flowchart depicting signal processing in MBs in a conventional B picture implemented by the coding control module 14 of the moving picture coding device depicted in FIG. 1.

Hereinafter, in the foregoing configuration, signal processing in macroblocks (MBs) in B pictures will be described with reference to flowcharts shown in FIGS. 2, 3. FIG. 2 is a flowchart illustrating the signal processing in MBs in the B picture regarding the invention to be executed at the coding control module 14 of the moving picture coding device shown in FIG. 1. FIG. 3 is a flowchart illustrating the signal processing in MBs in a conventional B picture to be executed at the coding device shown in FIG. 1.

In the invention, in a case that the picture type is a B picture, conditions by which signal processing is performed in skip MB are:

Condition 1: the signal processing is performed in a frame prediction mode, and an MB coded just before is an inter MB and in the same prediction direction Condition 2: an MB type is not present (not coded), namely, an expression 'coded block pattern (CBP)=0' is satisfied Condition 3: a difference vector (difference between a motion vector detected through ME (movement detection) processing and a prediction vector) is equivalent to '0'

Condition 4: the MB is not one positioned at the head or the end of a slice.

In FIG. 2, when the signal processing in MBs at the B picture is started, the signal processing firstly determines whether the quantization coefficient is equal to the threshold or larger (Block S11), and if the coefficient is equal to the threshold or larger; the signal processing performs ME processing using solely the frame prediction (Block S12). If the coefficient is smaller than the threshold, the coding device performs the ME processing after conventional frame/field prediction determination (Block S13). Since a resolution of a picture becomes poor with the deterioration of the bit rate and with the enlargement of the quantization coefficient, even the ME processing only by the frame prediction may suppress the deterioration in picture quality.

The coding device determines whether the signal processing is in an intra mode or in an inter mode (Block S14), then, performs DCT processing, quantization processing, inverse quantization (IQ) processing and IDCT processing (Block S15). The signal processing determines whether the MB is the inter MB (Block S16), whether the MB type is not present (not coded) (Block S17), whether the skip MB can be set (Block S18) and whether the value of the difference vector is within the threshold (Block 19).

In a case where it is determined that the inter MB is selected in Block S16, it is determined that the MB type is not present (not coded) (the foregoing condition 2) in Block S17, it is determined that the skip MB is the MB which can be set (the foregoing conditions 1, 4) in Block S18, and it is determined that the value of the difference vector is within the threshold in Block S19, and the coding device sets the signal processing to the skip MB (Block S20). If signal processing does not correspond to any of the determinations in Blocks S16-S19, the signal processing is not set to the skip MB. After this, the signal processing shifts to syntax processing in MB.

Meanwhile, in signal processing in MBs in the conventional B picture, the signal processing is performed in a procedure shown in FIG. 3. At first, after frame/field prediction determination, the signal processing performs the ME processing (Block S31), determines whether the signal processing is in the intra mode or in the inter mode (Block S32). After performing the DCT processing, quantization processing, inverse quantization processing and IDCT processing (Block S33), the signal processing determines whether the MB is the inter MB (Block S34), whether the MB type is not present (not coded) (Block S35), whether the skip MB can be set (Block S36), and whether the value of the difference vector is '0' (Block 37).

In a case where it is determined that the inter MB is selected in Block S34, it is determined that the MB type is not present (not coded) (the foregoing condition 2) in Block S35, it is determined that the skip MB is the MB which can be set (the foregoing conditions 1, 4) in Block S36, and it is determined that the value of the difference vector is '0' in Block S37, and the coding device sets the signal processing to the skip MB (Block S38). If signal processing does not correspond to any of the determination in Blocks S34-S37, the signal processing is not set to the skip MB. After this, the signal processing shifts to syntax processing in MB.

For comparing the processing procedure of FIG. 2 with that of FIG. 3, although the value of the difference vector is '0' at the condition 3, in the invention, in Block S19 as shown in FIG. 2, even if the value of the difference vector is within the threshold, it is assumed that the value of the difference vector is '0'. Thereby, in comparison with the signal processing in MBs in the conventional B picture in FIG. 3, in a case that the quantization coefficient is not smaller than the threshold, the frame prediction mode is apt to be selected, and the possibility to satisfy the conditions 1-4 which the signal processing may set to the skip MB becomes high. With the increase in skip MB, an information amount lower than the MB decreases and a coding amount becomes able to be suppressed. The deterioration in picture quality becomes able to be suppressed in the case where the quantization coefficient is equal to the threshold or larger.

Since the moving picture coding device having the foregoing configuration restricts the option of the prediction mode and allows the skip MB to be easily generated even when frame intervals are constant in a case where the bit rate is low and the quantization coefficient is large, the moving picture coding device can reduce a generation code amount of the B picture while suppressing the deterioration in picture quality.

The various modules of the systems described herein can be implemented as software applications, hardware and/or software modules, or components on one or more computers, such as servers. While the various modules are illustrated separately, they may share some or all of the same underlying logic or code.

While certain embodiments of the invention have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A moving picture coding device configured to perform a motion-compensated prediction for moving picture data in macroblocks, to apply a discrete cosine transform and a quantization to a prediction error obtained by the motion-compensated prediction to obtain a quantization step size, and to apply variable-length-coding to the quantization step size together with a motion vector to be obtained by the motion compensated prediction, comprising:

a coding controller configured to control coding modes of target macroblocks for the variable-length-coding in response to picture types respectively, wherein the coding controller comprises:

a quantization step size determining module configured to determine whether the quantization step size is equal or greater than a threshold when the picture type of the target macroblocks is a Bi-directional (B) picture which is not a reference frame for other frames;

a frame prediction mode processor configured to perform motion detection only by frame prediction if the quantization step size is equal to or greater than the threshold;

a conventional mode processor configured to perform the motion detection after a conventional frame/field prediction determination if the quantization step size is smaller than the threshold; and a skip determination controller configured to skip a coding of the target macroblocks under predetermined conditions after motion detection by the frame prediction mode processor or the conventional mode processor.

2. The moving picture coding device of claim 1, wherein the skip determination controller configured to omit code generation of macroblocks which satisfy conditions that a macroblock to be processed and a macroblock coded just before the macroblock to be processed are inter macroblocks with a same prediction direction; that macroblock types are not present; and that a difference between a motion vector and a prediction vector detected by the motion detection is substantially equivalent to '0'; and that the macroblock to be processed is not positioned at either a head or an end of a slice.

3. A moving picture coding method for performing a motion-compensated prediction of moving picture data in macroblocks, applying a discrete cosine transform and a quantization to a prediction error obtained by the motion compensated prediction to obtain a quantization step size, and applying variable-length-coding to the quantization step size together with a motion vector to be obtained by the motion-compensated prediction, when controlling coding modes of target macroblocks for the variable-length-coding in response to picture types, comprising:

determining whether the quantization step size is equal to or greater than a threshold when a picture type of the target macroblocks is a Bi-directional (B) picture which is not a reference frame for other frames;

performing motion detection only by frame prediction if the quantization step size is equal to or greater than the threshold;

performing the motion detection after conventional frame/field prediction determination if the quantization step size is smaller than the threshold; and skipping coding of the target macroblocks under predetermined conditions after motion detection.

4. A non-transitory recording medium with a computer-usable moving picture coding program, configured to perform a motion-compensated prediction for moving picture data in macroblocks, to apply discrete cosine transform and quantization to a prediction error obtained by the motion-compensated prediction to obtain a quantization step size, and to apply variable-length-coding to the quantization step size together with a motion vector to be obtained by the motion-compensated prediction, recorded thereon, the program comprising:

controlling coding modes of target macroblocks for the variable-length-coding in response to picture types respectively, wherein the controlling coding modes comprises:

determining as to whether the quantization step size is equal to or greater than a threshold if the picture type of the target macroblocks is a Bidirectional (B) picture which is not a reference frame for other frames;

motion detecting only by frame prediction if the quantization coefficient is equal to or greater than the threshold;

motion detecting after conventional frame/field prediction determination if the quantization coefficient is smaller than the threshold; and skipping coding of the target macroblocks under predetermined conditions after motion detection.

* * * * *